(12) United States Patent  (10) Patent No.: US 7,744,765 B2
Bjerkan et al.  (45) Date of Patent: Jun. 29, 2010

(54) WATER TREATMENT SYSTEM

(75) Inventors: Jørn-Rudi Bjerkan, Kongsberg (NO);
Morten Fredriksen, Fagerstrand (NO)

(73) Assignee: Firstwater Controls DA, Kongsberg (NO)

(*) Notice: Subject to any disclaimer, the term of this patent is extended or adjusted under 35 U.S.C. 154(b) by 0 days.

(21) Appl. No.: 12/087,997

(22) PCT Filed: Jan. 23, 2006

(86) PCT No.: PCT/NO2006/000028
§ 371 (c)(1),
(2), (4) Date: Aug. 21, 2008

(87) PCT Pub. No.: WO2007/084003
PCT Pub. Date: Jul. 26, 2007

(65) Prior Publication Data
US 2009/0008337 A1  Jan. 8, 2009

(51) Int. Cl.
C02F 1/00 (2006.01)
C02F 1/68 (2006.01)
B01D 21/24 (2006.01)
B01D 15/00 (2006.01)
B01J 20/00 (2006.01)

(52) U.S. Cl. .............. 210/741; 210/764; 210/765; 210/97; 210/167.1; 210/167.11; 210/198.1; 210/199; 222/57; 422/28; 422/112; 700/266; 700/301; 4/490

(58) Field of Classification Search .............. 340/573.6; 210/90, 97, 167.1, 167.11, 194, 198.1, 199, 210/741, 764, 765; 422/108, 110, 112, 28, 422/37; 700/266, 301; 4/487, 488, 538, 4/904, 490; 222/57
See application file for complete search history.

(56) References Cited

U.S. PATENT DOCUMENTS
4,133,058 A  1/1979  Baker
(Continued)

FOREIGN PATENT DOCUMENTS
DE  0 87 15 876 U1  3/1988
(Continued)

*Primary Examiner*—Matthew O Savage
*Assistant Examiner*—Paul J Durand
(74) *Attorney, Agent, or Firm*—Birch, Stewart, Kolasch & Birch, LLP (57) ABSTRACT

A system, a device and a method for maintaining water quality in a pool or similar water container for use by people which is characterized in that a pressure sensor is arranged to sense the pressure variations inside a main water container 1 and to provide a pressure variation signal to a control and processing unit 3. The control and processing unit is connected with a dispensing module and is adapted to generate and transfer control signals to said dispensing modules. The control signal depends on the detected pressure variation signal. The system for water treatment comprises also a water treatment circulation loop $3_{A-D}$ at least one controllable chemical dispensing module $8_{A-D}$, $9_{A-D}$. The circulation loop is adapted to pump water from the main water container 1, around the circulation loop $3_{A-D}$ and back into the main water container 1 via the dispensing module for dispensing a chemical treatment agent.

18 Claims, 7 Drawing Sheets

U.S. PATENT DOCUMENTS

| | | |
|---|---|---|
| 4,389,739 A | 6/1983 | Baker |
| 4,584,106 A | 4/1986 | Held |
| 4,584,206 A | 4/1986 | Sleighter |
| 4,685,158 A | 8/1987 | Lively |
| 4,759,907 A | 7/1988 | Kawolics et al. |
| 4,867,196 A | 9/1989 | Zetena et al. |
| 5,422,014 A | 6/1995 | Allen et al. |
| 5,628,896 A | 5/1997 | Klingenberger et al. |
| 5,895,565 A | 4/1999 | Steininger et al. |
| 6,125,481 A | 10/2000 | Sicilano et al. |
| 7,427,923 B2 * | 9/2008 | Durand .................... 340/573.6 |
| 2008/0174441 A1 * | 7/2008 | Durand et al. ........... 340/573.6 |

FOREIGN PATENT DOCUMENTS

| | | |
|---|---|---|
| EP | 0 659 956 A1 | 6/1995 |
| WO | WO-03/066999 A1 | 8/2003 |

* cited by examiner

WATER TREATMENT SYSTEM

FIELD OF THE INVENTION

The present invention is related to the maintenance of water quality in a in a pool, tub or other similar container using a water circulation arrangement.

In particular this invention is related to a dispensing device and an associated water treatment system for the addition of a treating agent, for example in the form of a liquid chemical agent, into a system for circulating water in a largely closed water system, such as for example a hot tub, a spa, a pool or the like.

1. Background of the Invention

Maintenance of water quality requires daily supervision and handling of chemicals, possibly in hazardous amounts, and such handling and supervision is therefore a challenge to a person responsible for such maintenance operations. The daily supervision requires at least a structured and controlled manual addition of chemicals in order to maintain water quality. This isn't always easy or convenient for the users. According to the HSE data sheets (Health, Safety and Environment) of some often used chemicals (i.e. sanitizers and oxidizers), it is required to use protective equipment for safe handling of the chemicals. There is a risk that users do not follow such safety precautions. Further, a user may be delay or avoid completely the necessary water treatment.

2. Prior Art

The patents U.S. Pat. Nos. 4,584,106 and 4,759,907 describe the addition of chemicals to the water in a spa. These solutions are directed at the controlled dissolution of solid treating agents into a liquid.

The patent U.S. Pat. No. 5,895,565 describes an integrated water treatment control system incorporating chemical treatment and water conditioning based on inputs of sensor data from chemical sensors and flow sensors in the system.

The patent application EP 0 659 956 A1 describes a feeder device for introducing a chemical into a pool where an auto dosing control system is operative to control the opening and closing of a control valve, whereby a controlled introduction of chemical into the pool water is provided.

German Utility Model DE 0 87 15 876 U1 describes a device for supplying an amount of a fluid protective agent for reducing the growth of algae, deposition of metal compositions, corrosion, and the like.

The integrated water treatment described in U.S. Pat. No. 5,895,565 describes the collection of input from a number of different types of chemical sensors in addition to flow rate data. However, this is an elaborate system which for many purposes is at present a too expensive solution for many applications due to rather large number of sensors devices and components. The large number of component also requires more space, a higher installation and maintenance activity and associated costs which may be allowable at large installations, but may not be possible at smaller installations.

It is hence a purpose of this invention to provide a new alternative technical solution which provides sufficient maintenance of water quality in small-scale circulating water systems such as hot-tubs, spas, pools and the like by adding a minimum number of components.

SHORT SUMMARY OF THE INVENTION

According to the present invention the above objective is in a first aspect of the invention achieved by providing a water treatment system with a main water container, a water treatment circulation loop, and at least one controllable chemical dispensing module, where said circulation loop is adapted to pump water from the main water container, around the circulation loop, and back into the main water container. The water treatment system is characteristic in that a pressure sensor is arranged to sense the pressure variations inside the main water container and to provide a pressure variation signal to a control and processing unit. The control and processing unit is connected to the dispensing modules and is further adapted to generate and transfer control signals to the dispensing modules via a control signal line. The control signal depends on said pressure variation signal.

In a preferred embodiment of the water treatment system according to the invention the processing unit is programmable so as to be able to provide a value representing the current usage of the main water container, the usage being a measurement of how many people are using the main water container and amount of time the main water container has been used.

In another preferred embodiment of the water treatment system according to the invention the dispensing modules include a number of chemical vessels, each chemical vessel being coupled via a peristaltic pump to a mixing chamber being a part of said circulation loop. This way the control signals determine the amount of chemical to inject into the circulating water.

In yet another preferred embodiment of the water treatment system according to the invention the control and processing unit is adapted to check the usage of the main water container, whereby the control signals being generated and sent to the peristaltic pumps depend on the outcome of said usage check.

In yet another preferred embodiment of the water treatment system according to the invention the duty cycle of the chemical dispensing function is set by the control and processing unit on the basis of input signals of a pressure sensor. The pressure sensor is located so as to sense the pressure variations in said main water container caused by people using/entering the spa.

In still another preferred embodiment of the water treatment system according to the invention the pressure sensor is coupled with the main water container via a hose or pipe entering the main water container via a housing of a water filter.

In a further preferred embodiment of a water treatment system according to the invention the pressure sensor is coupled with said main water container via a hose or pipe entering said main water container via a pressure nipple arranged in a hole in a wall of said main water container.

In yet another preferred embodiment of the water treatment system according to the invention the pressure sensor is mounted in a flange arranged in a hole in a wall of said main water container.

In still another preferable embodiment of the water treatment system according to the invention the controllable chemical dispensing modules are arranged in thermal contact with a part of the water circulation system in order that heat energy of the water is used to prevent the controllable chemical dispensing modules from freezing.

In a second aspect of the invention there is provided a dispensing device for dispensing a controlled amount of a chemical into a water container, such as e.g. a pool or spa, being used periodically by people where a pressure sensing device is arranged to sense pressure variations in the water contained by said container. A dispensing device is coupled to said water container for dispensing a controlled amount of a water treatment chemical into said water, and a processing unit has an input connected to said pressure sensing device, said processing unit being adapted for generating an output signal to said dispensing device. The said signal depends on the said pressure input signal, and the dispensed amount of chemical depends on the sensed pressure variations.

In a preferable embodiment of the dispensing device according to the invention a signal filter is arranged to filter the signal from the pressure sensing device. The signal filter is in an embodiment adapted to attenuate the high frequency components of the pressure signal while passing low frequency components. In a more particular embodiment of the dispensing device according to the invention the signal filter comprises a low-pass filter with a cut-off frequency of about 5 Hz.

In a preferable embodiment of the dispensing device according to the invention the signal filter is an electronic circuit having a filtering function and is integrated in the pressure sensor 2. In another preferable embodiment the signal filter is a computer program module incorporating a filtering function is a part of the computer program running in the main programmable processing module.

In a third aspect of the invention there is provided a method of maintaining the quality of water in a container, such as a pool or spa for use by people, the method comprising at least the step of detecting pressure variations in the water in the container due to the activity of people present in the container by the use of a pressure sensing device. The method also comprises the step of generating a pressure variation dependent output signal using a processing unit taking as an input an output of said pressure sensing device, and transferring said output signal to a controllable dispensing device adapted and arranged for dispensing a chemical into said water in dependence on said generated signal. This way the amount of dispensed chemical is made to depend on the activity of people using the container, whereby the dosage of chemical agent can be tailored to the actual usage conditions of the pool, spa or the like.

DETAILED DESCRIPTION OF THE INVENTION

Figure 1:
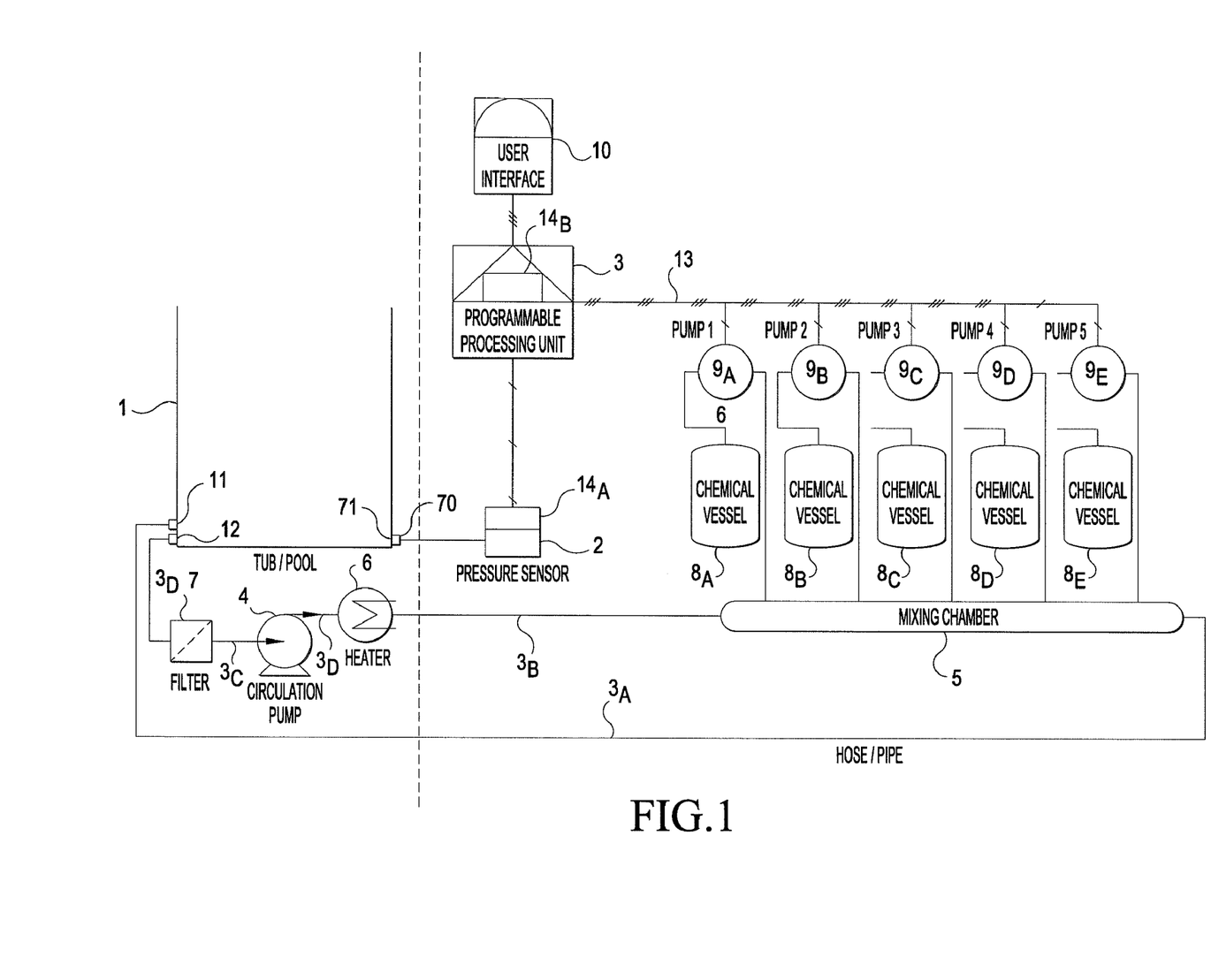
FIG. 1 illustrates a preferred embodiment of a water treatment system including a pressure sensor according to the invention.

FIG. 1 shows a detailed diagram of a water treatment system according to the invention. A gauge/differential pressure sensor 2 is coupled to a main water container 1 for recording the pressure variations in the main water container 1. The pressure sensor 2 is connected to the container, well below the minimum recommended water level, via a small pipeline through the container 1 wall. The main water container could be a pool, a hot-tub or a spa, or any other similar container. In the following the term spa has been used for simplicity, however, without intending to limit the meaning of this particular type of main water container. Any other water container used by people for recreational purposes is intended to be included within the meaning of this term. The pressure sensor is connected to a programmable processing unit 3 which is adapted to receive and process pressure signals from the pressure sensor 2.

The programmable processing unit 3 is further adapted to receive and process user generated information from a user interface 10. The user input comprises setup data like volume and surface area of container 1 and dosing tables for each chemical to be used. System reset functionality is made available in order that the user may reset the system, before use and after water has been changed.

An important feature of the processing unit 3 is the generation of outputs to any one or more peristaltic pumps $9_{A-E}$ which are coupled to chemical vessels $8_{A-E}$ for pumping some amount of chemical material stored in one or more of the chemical vessels into a mixing chamber 5. A pump $8_X$ and a chemical vessel $9_X$ together forms one controllable dispensing module $8_X, 9_X$.

In some embodiments of the invention the said controllable chemical dispensing modules are arranged in thermal contact with a part of the water circulation system, in order that heat energy of the water is used to prevent the controllable chemical dispensing modules $8_{A-D}, 9_{A-D}$ from freezing. This way heat energy is conducted to the dispensing module. Depending on the heat conducting properties, the dispensing modules can withstand a lower temperature without freezing in than without such heat conduction via said thermal contact.

The mixing chamber 5 is part of a circulation loop $3_{A-D}$ which circulates the water contained by the water treatment system according to the invention. The circulation loop $3_{A-D}$ is connected to an inlet/outlet 11,12 of the main water container or spa 1. If not supplied with the spa, a pump 4 needs to be installed. The pump 4 is inserted in the circulation loop in order to drive the circulation of water in the circulation loop.

If not already in the spa circulation circuit, a filter 7 may also be inserted in the circulation loop $3_{A-D}$ for removing particulate matter from the flowing water. The heater 6 may also be inserted in the circulation loop $3_{A-D}$ for heating the water flowing in the circulation loop $3_{A-D}$. The water is circulated from the container 1 through the pump 4 via the heater 6 into the mixing chamber 5 and back to the container 1.

By performing basic signal processing of the registered pressure signal in the processing unit 3 it is possible to detect when one or more persons have entered into the spa 1, to calculate how many people have entered, or to be more specific the volume of the persons who have entered, and to detect how long they are staying there. This can be achieved by monitoring the variations in pressure level. This can be obtained using fairly ordinary signal processing of the detected pressure signals. The system according to the invention differentiates between filling/emptying of water and people entering the spa by the rate of change in pressure. If the pressure changes slowly the system will assume a change in water content rather than the spa being used, and thus set the new pressure value as value for spa not in use. If the pressure is increasing fast (ie. more than 1 l/sec) the system will assume someone is entering the spa. According to the above, a usage parameter may be calculated for the water container.

Typically, such a usage parameter is continuously updated based on continuous pressure signal, or the usage parameter is updated at a regular interval. In one alternative the update interval may vary depending on the characteristics of the detected pressure signal.

Based on the calculated usage parameter the processing unit generates a suitable control signal to the peristaltic pumps $9_{A-E}$ for pumping a corresponding amount of chemical from the chemical vessel associated with the relevant pump into the mixing chamber 5. Hence, the amount of chemical injected into the water stream is made to depend upon the usage of the spa 1. Further, the control outputs generated by the processing unit also depend on the dosing data entered by the user through the user interface at the time of installation. The processing unit 3 typically comprises a microprocessor or a computer or any other suitable computing means for running a computer program realized in hardware or software or a combination of both. The computer program is typically pre-stored in a program storage element integrated in or connected to the processing unit. It is the short-term variations in the pressure signal from the pressure sensor 2 which are of primary interest in this invention. The absolute value of the pressure or long term changes, for example due to emptying, filling, or evaporation of water is not of primary interest in this invention, but can in some embodiments of the invention be required for compensation of the pressure sensor 2. Long term variations will not be interpreted by the system as human use of the pool, spa or the like.

Preferably, a signal filtering unit $14_A$ or signal filtering program module $14_B$ is arranged to provide a low-pass filtering operation on the signal from the pressure sensor. With a low pass filter most of the signal noise due to electric noise and noise caused by bubbles and whirls in the container, which could be significant in, for example, a massage bath. After low pass filtering, subsequent signal processing is preferably performed in the control and processing unit 3. The signal frequency band of 0-5 Hz, or preferably a band of 0-2.5 Hz, or more particularly a frequency band of 0.25-2.5 Hz is processed in order to calculate a value representing usage of the pool or bath (container) by one or more humans. Typically, a low pass filter having a cutoff frequency at about 5 Hz is used for filtering the signal from the pressure sensor.

The value representing the usage of the pool can in some embodiments of the invention be converted to a value which is understandable to a human, for example, as a change in liters per minute. This human understandable value is communicated to and optionally presented on the user interface 10.

In a water treatment system or dispensing device according to the different aspects of the invention a signal filter is in one alternative arranged to filter the signal from the pressure sensing, for example by attenuating low frequency components of the pressure signal while allowing higher frequency components to pass largely with largely unchanged amplitude. This could in one alternative be achieved by providing a signal filter $14_A$ which is integrated in the pressure sensor 2 in the form of an electronic circuit having a filtering function. In another alternative the signal filter is a computer program module $14_B$ incorporating a filtering function and which is a part of the computer program running in the main programmable processing module. In still another alternative the pressure sensing device comprises an analogue to digital converter and a digital processing module which is provided with signal processing hardware and/or software performing the filtering out high frequency components in the pressure sensor itself and communicating a resulting filtered digital representation of the pressure signal via digital communication protocol to a main programmable control and processing unit 3 which is responsible for providing interfacing with a user interface and control signals to the chemical dispensing devices 8,9.

Program updates for the programmable processing unit, and alternatively also for the pressure sensing device, may be delivered on a replacement chip or downloaded by means of a programming unit.

In alternative embodiments of the invention the processing unit may also provide controls signals to the circulation pump as well as to an optional heating element, where the control signals to these units also is made to depend on the input from the pressure sensor.

In the above the invention is described with reference to one pressure sensor, however, anyone of ordinary skill in the art will understand upon having this disclosure available, that any practical number of pressure sensors could in principle be coupled with the spa and connected to the processing unit 3 without departing from the general idea of the invention. However, it is important for the invention to work that the pressure sensor or a pressure sensor inlet is localized well below a recommended lowest water level for the container.

Figure 2:
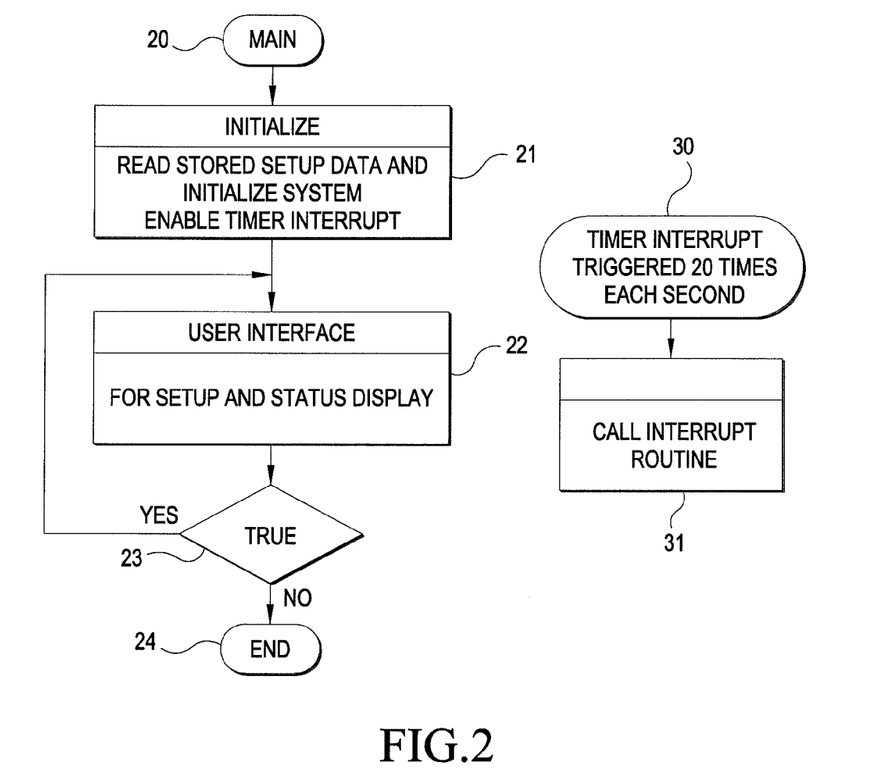
FIG. 2 is a flow chart of the steps of an example of a main routine and a timer interrupt event being performed in the processing unit in a water treatment system according to the invention.

FIG. 2 shows a flow chart for a main routine 20 and a timer interrupt event routine 30 which is part of the computer program running in the processing unit 3. The main routine illustrated on the left side in FIG. 2 comprises an initialization step 21 in which stored setup data are read and the system is initialized. In the initialization step 21 an interrupt timer 30 is also enabled. Following the initialization 21 the main routine enters into a user interface step 22 in which a user interface 10 is setup to display the status of the system. Then the main routine 20 enters into a loop 23 which is iterated as long as a given set of conditions are true, for example the condition that the user has not generated a stop signal from the user interface.

To the right in FIG. 2 there is shown an interrupt timer 30. The timer could be set to trigger an interrupt signal at regular intervals, for example 20 times every second. Upon detecting such a trigger signal, the processing unit starts an interrupt routine, illustrated by the flow chart of FIG. 3.

Figure 3:
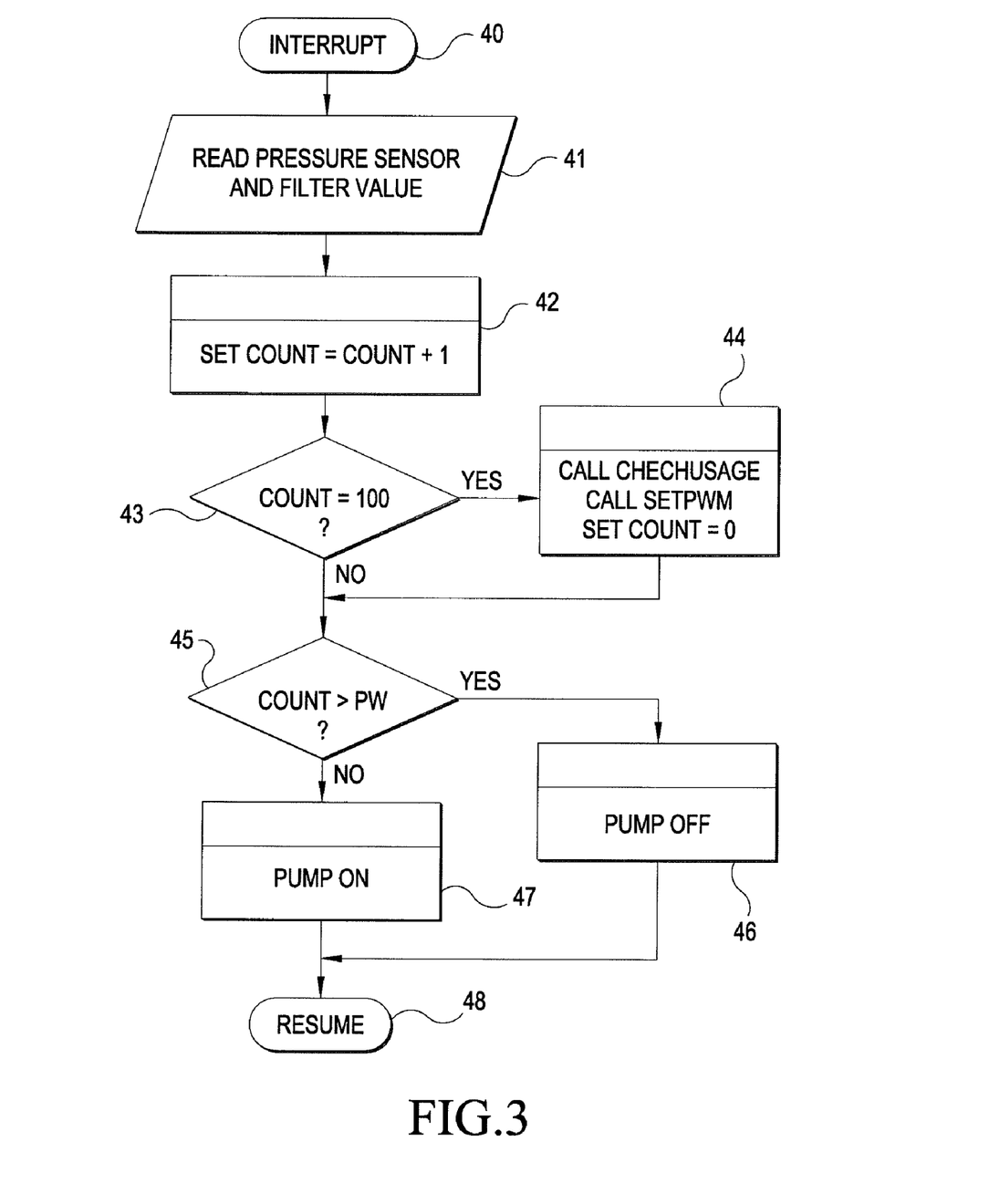
FIG. 3 is a flow chart of the steps of an example of an interrupt routine being performed in the processing unit in a water treatment system according to the invention.

As illustrated on FIG. 3, the interrupt routine 40 begins by reading a pressure value from the pressure sensor 2 accumulating the value in a variable. Following the reading of the pressure sensor, an integer variable (count) is incremented by 1. Next a first comparison 43 is made where it is checked whether the value of count value has reached 100. A count value of 100 corresponds to a total of 100 interrupt events, i.e. a period of 5 seconds provided there are 20 interrupts generated every second. If yes, the interrupt routine calls 44 a usage check routine 50 and a setPWM routine 60 (see more details of these routines) below, and after executing these routines, the variable count is set to the value of zero.

If count is not equal to 100 (i.e. it is below 100), the interrupt routine continues to a second comparison step 45, in which the value of count is compared to a pulse width (PW) integer which determines which fraction of a 5 second period (if routine is set to reset count to 0 when it reaches a value of 100 and 20 interrupts every second) that the peristaltic pumps (for the chemicals) should be ON. If for example PW has a value of 50, the peristaltic pumps will be kept on in step 47, giving a 50% duty cycle for the pumps (typically 2.5 seconds of ON-time), but the pumps will be switched off as soon as count becomes larger than 50. The pump is shown to be turned on in step 47. After setting the pump status the interrupt routine ends, however, as a new interrupt routine is initiated upon the next interrupt event.

Figure 4:
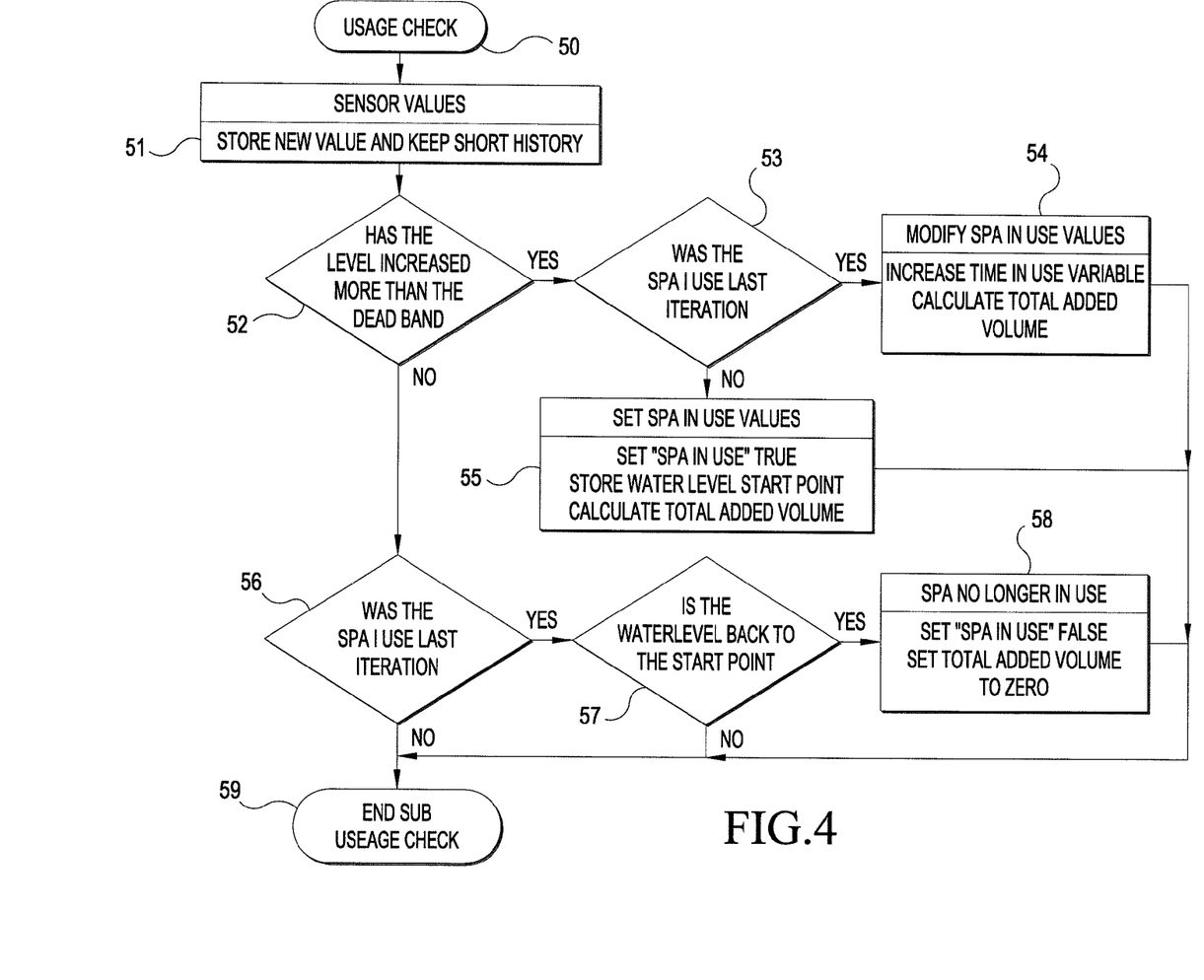
FIG. 4 is a flow chart of the steps in a usage check routine being performed in the processing unit in a water treatment system according to the invention.

FIG. 4 illustrates a usage check routine which starts in a sensor value storage step 51, where the average value of the last 100 sensor samples are collected and/or stored, and a short history of previous sensor values are maintained. Next, the pressure level is checked 52 to see if it has increased beyond a dead band level. If yes, it is then checked if the spa was in use 53 in the last iteration. If the spa was in use in the last iteration, then one or more spa in use values will be modified. This includes increasing a variable indicating the time that the spa has been in use, and a calculation of the added volume which the increased in pressure level represents, after which the usage check routine is exited. If on the other hand, the spa was not in use in the last iteration, a variable indicating that the spa is in use is set to "TRUE" and a water level start point value is stored. Also, a total added volume value representing the increase in pressure level is calculated and stored, after which the spa usage check routine is exited.

If in the beginning of the usage check routine it is determined 52 that the pressure level has not increased more than a dead band value, in a following step it is checked 56 if the spa was in use in the last iteration. If no, the usage check is exited. If yes, in the following step it is checked 57 if the water level is back at a starting point. If no, the usage check routine is exited. If yes, a "spa in use" parameter is set to "FALSE" and the total added volume is set to zero after which the usage check is exited.

Figure 5:
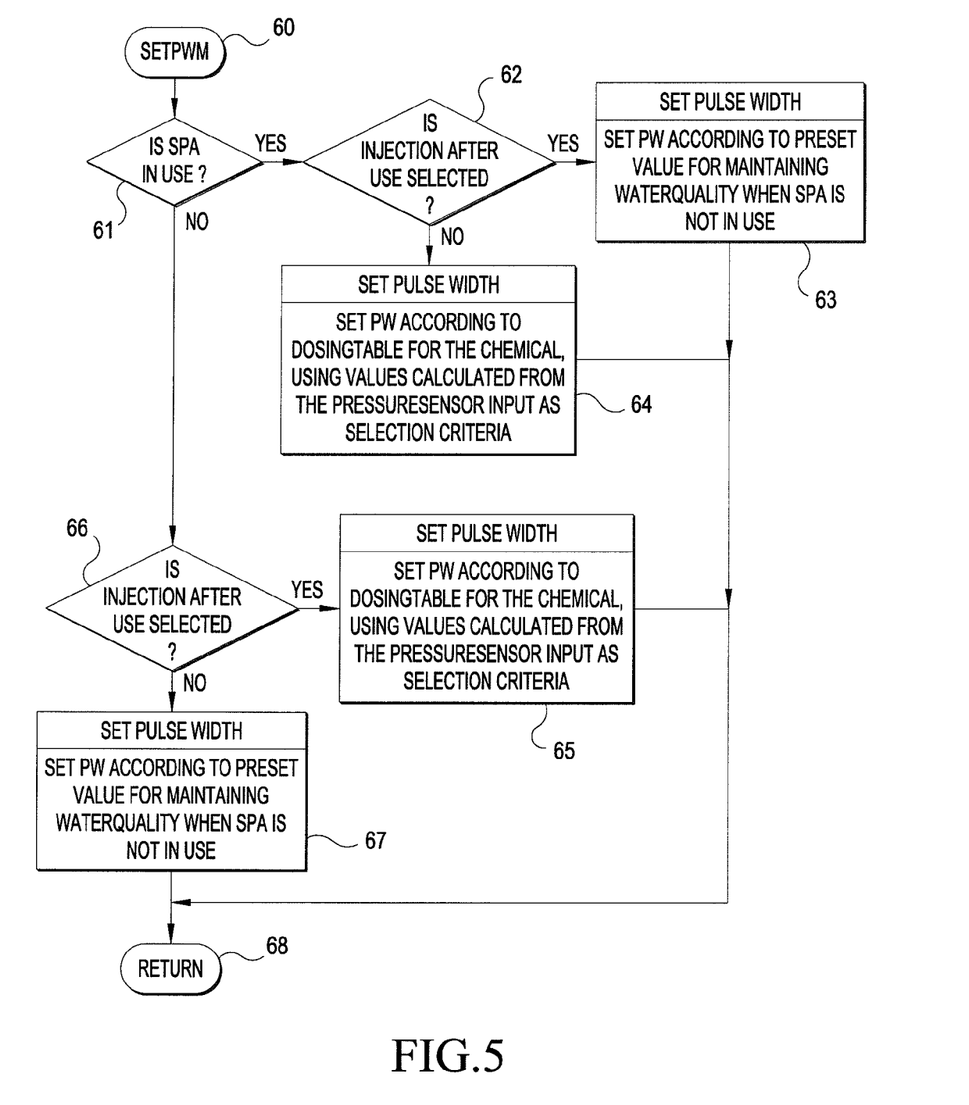
FIG. 5 is a flow chart for a pump control routine being performed in the processing unit in a water treatment system according to the invention.

The setPWM routine is illustrated on FIG. 5. In a first step 61 of this routine it is checked whether the spa is in use. If yes, then in a next step 62 it is checked to see if "injection after use" (of chemicals) has been selected, e.g. by user input. If yes, the pulse width (PW) is set 63 according to a preset value for maintaining water quality when the spa is not in use. If no, the pulse width (PW) is set according to a dosage table for the chemical being used, using values calculated from the pressure sensor input as selection criteria. After setting the PW, the setPWM routine is exited. If at the start of the setPWM routine it is determined that the spa is not in use 61, a check 66 is then made to find if "injection after use" is selected. If yes, the pulse width (PW) is set according to a dosage table for the chemical being used, using values calculated from the pressure sensor input as selection criteria, after which the setPWM routine is exited. If no, the pulse width (PW) is set 63 according to a preset value for maintaining water quality when the spa is not in use. This gives two ways of dosing, if "injection after use is TRUE then dosing to restore water quality is started after everyone has left the spa. On the other hand, if "injection after use is FALSE then dosing to restore water quality is started when persons are entering the water.

Figure 6:
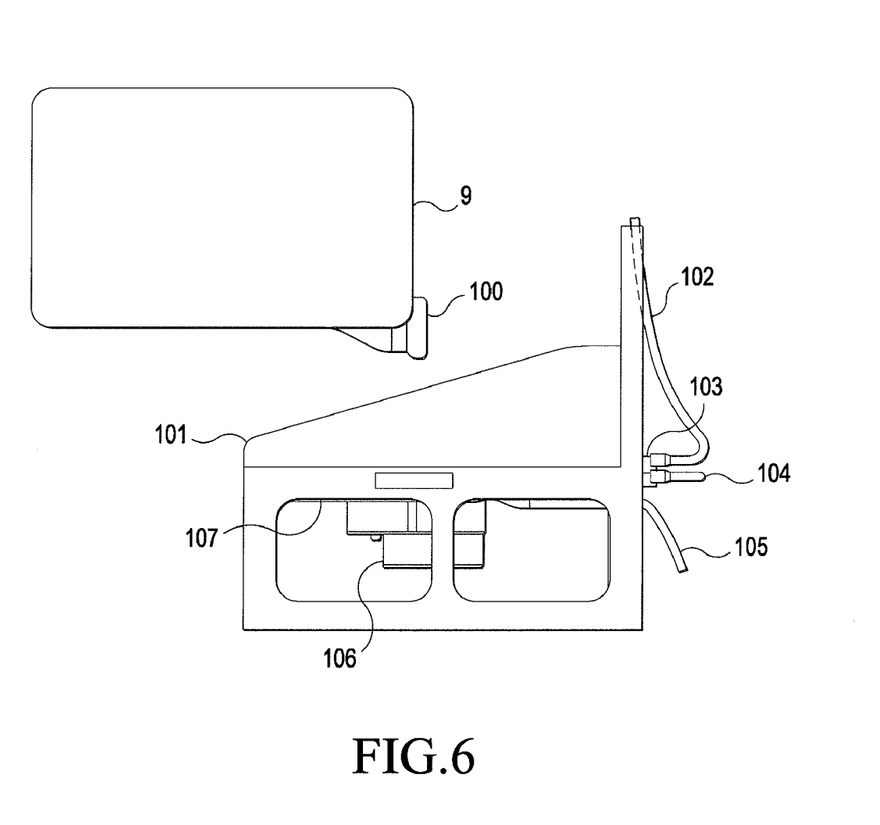
FIG. 6 is a side view of an example of a mounting frame module for allocating a single chemical vessel for use in the water treatment system according to the invention.
Figure 7:
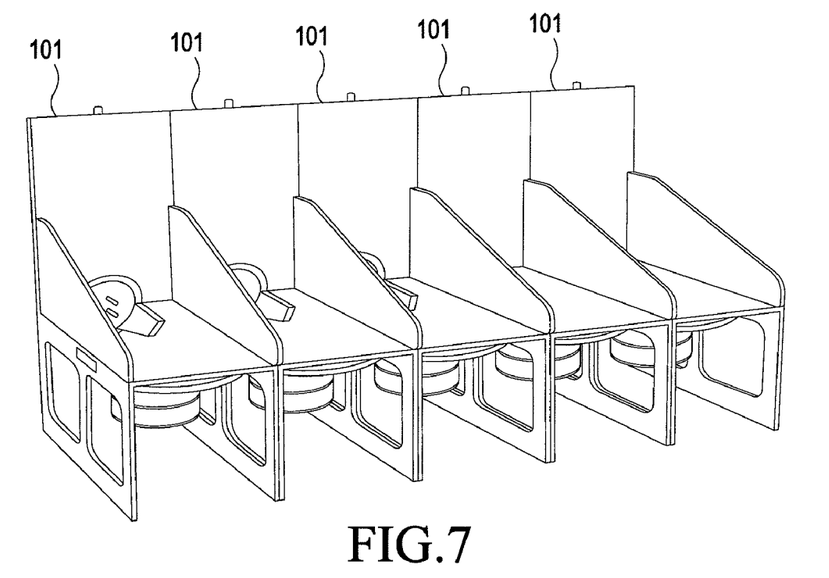
FIG. 7 shows a perspective view of a combination of five mounting modules in a mounting rack, for allocating five chemical vessels.
Figure 8:
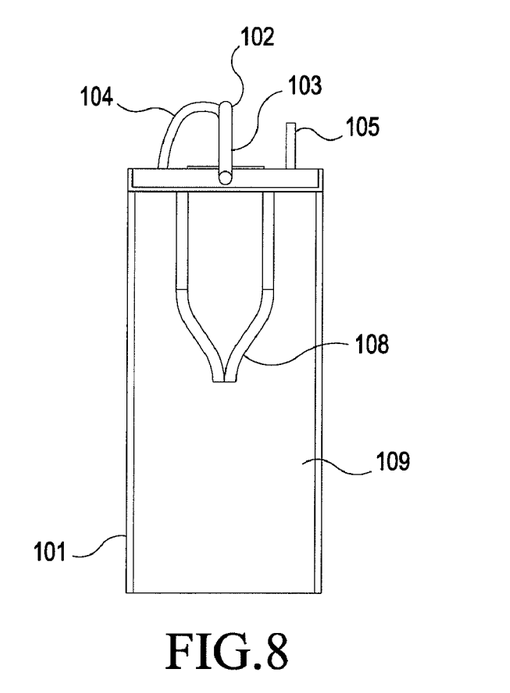
FIG. 8 is a top view of a mounting module.

In practice a mounting arrangement as illustrated in FIGS. 6-8 may be used to hold the set of five chemical vessels illustrated on FIG. 1. Each mounting module 101, illustrated on FIG. 6 may be adapted to allocate a single chemical vessel 9. The chemical vessel 9 is normally closed until it is inserted into the mounting module 101. The mounting module 101 has an opening and coupling mechanism 108 which opens and couples a corresponding opening 100 on each chemical vessel. The vessel opening is initially closed, and could be realized in the form of a rubber plug or seal which will be perforated by a sharp part of the opening and closing mechanism 108 when the chemical vessel 9 is inserted into the mounting module 100.

The mounting arrangement illustrated on FIG. 6 could also be adapted to allocate the peristaltic pumps and the processing unit in corresponding encapsulations, for example as indicated by the motor 106 and pump 107 on FIG. 6. Associated electric connections are not illustrated. Hose/pipe 104 couples the coupling mechanism 108 to the pump 107. The pump 107 is typically driven by a motor 106. The motor 106 is controlled by the above described processing unit 3 in the above described procedures/routines, whereby it is ensured that the pump 107 provides for a correct amount of chemical to be pumped from the chemical vessel 9 via hose/pipe 105 and into the water, preferably mixed with the circulating water in a mixing chamber 5 which would be connected to hose/pipe 105. FIG. 7 shows one example of how five mounting modules 101 can be connected to form a mounting rack which is able to allocate five chemical vessels 9.

The pressure sensor is preferably mounted well below the minimum recommended water level for the spa. It is also preferable to select a spot in the spa where the influence of water currents from massage jets are as little as possible.

The pressure sensor 2 may be arranged to be coupled with said main water container via a hose or pipe entering said main water container 1 via a pressure nipple 70 arranged in a through hole 71 defined by a wall of said main water container 1. A hole can be drilled in the wall of the container. In another alternative arrangement, the pressure sensor 2 is mounted in a flange arranged in a hole in a wall of said main water container 1. In yet another alternative arrangement, the pressure sensor 2 may be arranged so at to be coupled with said main water container 1 via a hose or pipe entering said main water container 1 via a housing provided for a water filter 7.

The water treatment system according to the invention provides a controlled introduction of one or several chemicals into the water of a spa. The exact parameters of the control algorithm will necessarily have to adjusted to the design of the spa under consideration and perhaps also to the quality/characteristics of the actual water being used. However, reduced maintenance requirement has been achieved with this invention at a much lower cost than with other solutions known to these inventors. Also, it is relatively simple to assemble a water treatment system according to the invention, it requires relatively little service, the chemical vessels can easily be replaced, and the data program running in the process unit may easily be adapted to a number of different conditions and spa designs.

Further, an advantageous feature of the water treatment system according to the invention is that it may to a large extent utilize existing or already installed water circulation systems. A typical installed water circulation loop for a pool or spa typically includes a filter, a pump and a heating element.

The invention claimed is:

1. A water treatment system comprising:
   a main water container,
   a water treatment circulation loop,
   at least one controllable chemical dispensing module,
   said circulation loop being adapted to pump water from the main water container, around the circulation loop, and back into the main water container,
   wherein a pressure sensor is arranged to sense the pressure variations inside the main water container and to provide a pressure variation signal to a control and processing unit, said control and processing unit being connected to said dispensing modules and being adapted to generate and transfer control signals to said dispensing modules via a control signal line, said control signal depending on said pressure variation signal.

2. The water treatment system according to claim 1, wherein the processing unit is programmable so as to be able to provide a value representing the current usage of the main water container.

3. The water treatment system according to claim 1, wherein the dispensing modules comprise a number of chemical vessels, each chemical vessel being coupled via a peristaltic pump to a mixing chamber being a part of said circulation loop whereby said control signals determine the amount of chemical to inject into the circulating water.

4. The water treatment system according to claim 1, wherein the control and processing unit is adapted to check the usage of the main water container, whereby the control signals being generated and sent to peristaltic pumps depend on the outcome of said usage check.

5. The water treatment system according to claim 1, wherein the duty cycle of the chemical dispensing function is set by the control and processing unit on the basis of input signals of a pressure sensor, said pressure sensor being located so as to sense the pressure variations in said main water container caused by people using/entering the main water container.

6. The water treatment system according to claim 1, wherein said pressure sensor is coupled with said main water container via a hose or pipe entering said main water container via a housing of a water filter.

7. The water treatment system according to claim 1, wherein said pressure sensor is coupled with said main water container via a hose or pipe entering said main water container via a pressure nipple arranged in a hole in a wall of said main water container.

8. The water treatment system according to claim 1, wherein said pressure sensor is mounted in a flange arranged in a hole in a wall of said main water container.

9. The water treatment system according to claim 1, wherein said at least one controllable chemical dispensing module is arranged in thermal contact with a part of the water treatment circulation loop, in order that heat energy of the water is used to prevent the at least one controllable chemical dispensing module from freezing.

10. The water treatment system according to claim 1, wherein the main water container is a spa.

11. A dispensing device for dispensing a controlled amount of a chemical into a water container, such as e.g. a pool or spa, comprising:
a pressure sensing device arranged to sense pressure variations in water contained by said container,
a dispensing device coupled to said water container for dispensing a controlled amount of a water treatment chemical into said water,
a processing unit having an input connected to said pressure sensing device, said processing unit being adapted for generating an output signal to said dispensing device, where said signal depends on the said pressure input signal, so that the dispensed amount of chemical is made to depend on the sensed pressure variations.

12. The dispensing device according to claim 11, comprising a signal filter arranged to filter the signal from the pressure sensing device.

13. The dispensing device according to claim 12, wherein the signal filter is adapted to attenuate the high frequency components of the pressure signal while passing low frequency components.

14. The dispensing device according to claim 12, wherein the signal filter comprises a low-pass filter with a cut-off frequency of about 5 Hz.

15. The dispensing device according to claim 12, wherein the signal filter is an electronic circuit having a filtering function and which is integrated in the pressure sensor.

16. The dispensing device according to claim 12, wherein the signal filter is a computer program module incorporating a filtering function and which is a part of the computer program running in the main programmable processing module.

17. A method of maintaining the quality of water in a container, the method comprising the steps of
detecting pressure variations in the water in the container due to the activity of people present in the container by the use of a pressure sensing device,
generating a pressure variation dependent output signal using a processing unit taking as an input an output of said pressure sensing device,
transferring said output signal to a controllable dispensing device adapted and arranged for dispensing a chemical into said water in dependence on said generated signal, whereby the amount of dispensed chemical is made to depend on the activity of people using the container.

18. The method according to claim 17, wherein the container is a pool or spa.

* * * * *